United States Patent
Legrand

(10) Patent No.: US 9,549,501 B2
(45) Date of Patent: Jan. 24, 2017

(54) TRIMMER HEAD FOR A VEGETATION CUTTING MACHINE

(71) Applicant: SPEED FRANCE SAS, Arnas (FR)

(72) Inventor: Emmanuel Legrand, St. Villeneuve (FR)

(73) Assignee: SPEED FRANCE SAS, Arnas (FR)

( * ) Notice: Subject to any disclaimer, the term of this patent is extended or adjusted under 35 U.S.C. 154(b) by 8 days.

(21) Appl. No.: 14/677,913

(22) Filed: Apr. 2, 2015

(65) Prior Publication Data

US 2016/0029556 A1    Feb. 4, 2016

(30) Foreign Application Priority Data

Aug. 1, 2014   (EP) .................................. 14306232

(51) Int. Cl.
*A01D 34/416*    (2006.01)

(52) U.S. Cl.
CPC ....... *A01D 34/4166* (2013.01); *A01D 34/4168* (2013.01)

(58) Field of Classification Search
CPC .................... A01D 34/4166; A01D 34/4168
See application file for complete search history.

(56) References Cited

U.S. PATENT DOCUMENTS

| | | | | |
|---|---|---|---|---|
| 4,268,964 A * | 5/1981 | Moore | ................... | A01D 34/84 30/276 |
| 5,170,561 A | 12/1992 | Sepke | | |
| 6,446,346 B1 * | 9/2002 | Castleman | ........... | A01D 34/416 30/276 |
| 8,973,274 B2 * | 3/2015 | Proulx | ............... | A01D 34/4166 30/122 |
| 9,210,838 B2 * | 12/2015 | Jerez | ..................... | A01D 34/416 |
| 2008/0141543 A1 * | 6/2008 | Guerra | ............... | A01D 34/4168 30/347 |
| 2008/0282659 A1 * | 11/2008 | Legrand | ............ | A01D 34/4166 56/12.7 |
| 2012/0066915 A1 * | 3/2012 | Alliss | ................. | A01D 34/4166 30/347 |

(Continued)

FOREIGN PATENT DOCUMENTS

DE    10 2012 016026    2/2014
EP    2 692 221    2/2014

(Continued)

*Primary Examiner* — Hwei C Payer
(74) *Attorney, Agent, or Firm* — Blakely Sokoloff Taylor & Zafman LLP

(57) ABSTRACT

The invention relates to a trimmer head comprising: a body to be coupled to a driving shaft of a vegetation cutting machine for rotating about a rotation axis, at least one rod comprising at least one retaining portion for holding a cutting filament in a determined direction, wherein the body comprises a housing for receiving each end of the rod such that the rod axis is perpendicular to the rotation axis of the body and substantially tangential to the rotational path of the body, the housing and the rod ends having respective shapes allowing at least two relative orientations of the rod relative to the body: a first orientation wherein the determined direction is substantially parallel to the rotation axis of the body, and a second orientation wherein the determined direction is substantially radial and substantially perpendicular to the rotation axis of the body.

15 Claims, 4 Drawing Sheets

(56) References Cited

U.S. PATENT DOCUMENTS

2014/0109411 A1* 4/2014 Arnetoli ............ A01D 34/4166
                                                          30/123
2016/0029556 A1* 2/2016 Legrand ............ A01D 34/4166
                                                          30/276

FOREIGN PATENT DOCUMENTS

EP      2 721 915 A1 *  4/2014
EP      2 979 531 A1 *  2/2016

* cited by examiner

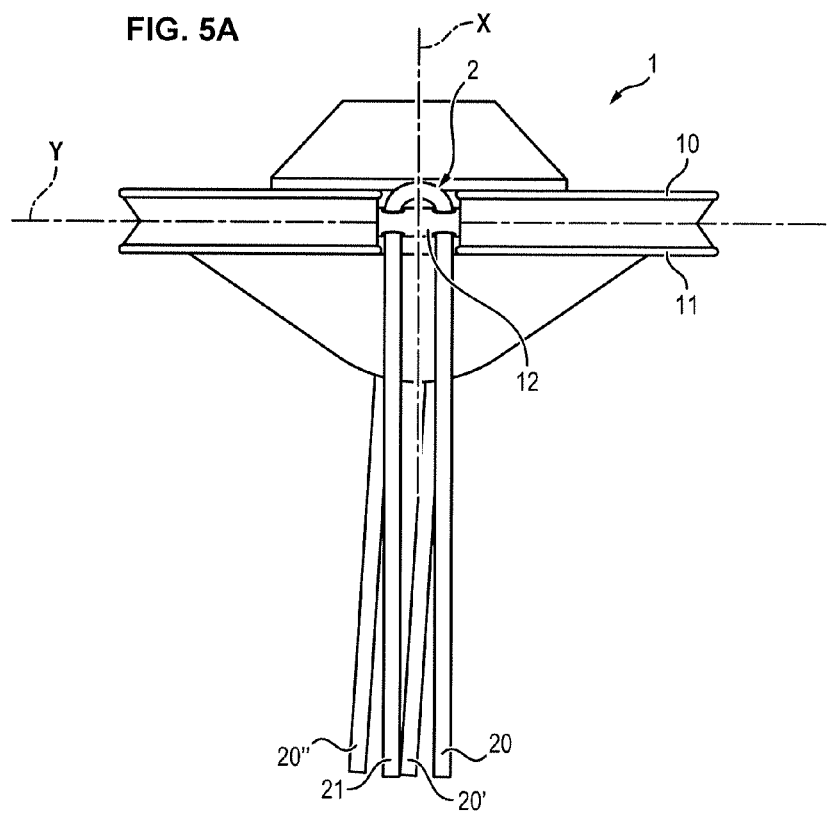
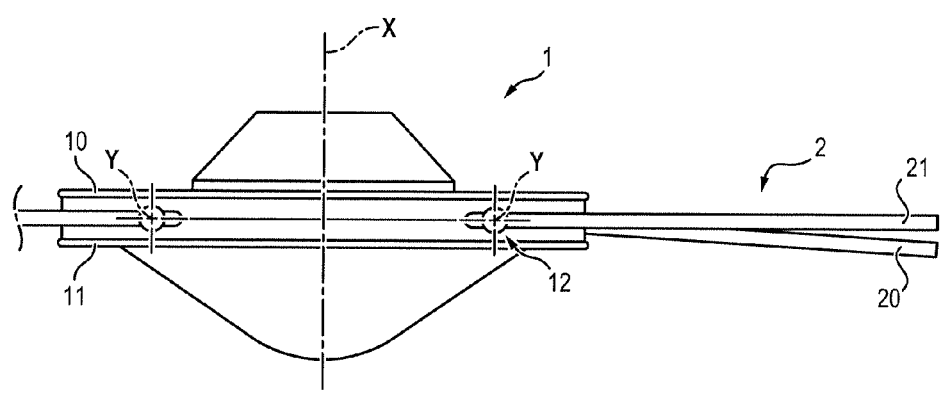

TRIMMER HEAD FOR A VEGETATION CUTTING MACHINE

FIELD OF THE INVENTION

The invention relates to a trimmer head for a vegetation cutting machine and to a trimmer head assembly comprising such a head and at least one cutting filament held by said head.

BACKGROUND OF THE INVENTION

Trimmer heads adapted for a modular use are of interest since with one trimmer head different possible uses are allowed. Such uses comprise:
(i) cleaning ground (e.g. pavement)
(ii) cutting vegetation.

For cleaning ground, an orientation of the cutting filament that is substantially perpendicular to the ground (i.e. substantially parallel to the rotation axis of the trimmer head) is sought, whereas for cutting vegetation, an orientation of the cutting filament that is substantially parallel to the ground (i.e. substantially perpendicular to the rotation axis of the trimmer head) is sought.

Document DE 102012016026 describes a trimmer head for a vegetation cutting adapted to hold at least one cutting filament in either of said two orientations, depending on the intended use.

Said trimmer head comprises a body containing a support for holding a plurality of cutting filaments. Said support is a convex part comprising a plurality of slots, disposed in a regular manner along the circumference of the support. The slots are arranged by pairs, each slot forming a pair with a diametrically opposed slot. Each cutting filament is inserted in a pair of slots, such that substantially equal lengths of the filament extend on either side of the support, in a direction substantially perpendicular to the rotation axis of the body.

Said trimmer head further comprises a concave ring that may be coupled to the convex support so as to constrain both lengths of the filament in a direction substantially parallel to the rotation axis of the body.

The structure of said head is complicated and cumbersome.

In addition, switching from an orientation of the cutting filament to the other one requires complex and time-consuming dismantling and reassembling of the trimmer head.

BRIEF DESCRIPTION OF THE INVENTION

A goal of the invention is thus to provide a trimmer head intended to hold a cutting filament in at least two different orientations, which is more compact that the known trimmer head and that is simpler to use.

To that end, an object of the invention is a trimmer head for a vegetation cutting machine, comprising:
- a body adapted to be coupled to a driving shaft of the vegetation cutting machine so as to cause said body to rotate about a rotation axis,
- at least one rod comprising at least one retaining portion intended to hold a cutting filament in a determined direction,
wherein the body comprises a housing for receiving each end of said rod such that the rod axis is perpendicular to the rotation axis of the body and substantially tangential to the rotational path of the body, said housing and said ends of the rod having respective shapes allowing at least two relative orientations of the rod with respect to the body:

(i) a first orientation wherein the determined direction of the filament is substantially parallel to the rotation axis of the body, and
(ii) a second orientation wherein the determined direction of the filament is substantially radial and substantially perpendicular to the rotation axis of the body.

According to an embodiment, the rod is locked within the housing in either the first orientation or the second orientation.

To that end, at least one rod end and a portion of the housing may have complementary polygonal shapes.

According to another embodiment, the rod ends are pivotally mounted in the housing, the trimmer head further comprising at least one spring urging the rod in the first orientation against the centrifugal force generated by the rotation of the body while the body rotates at a rotation speed that is less than a first predetermined speed.

Advantageously, said at least one spring is configured such that when the body rotates at a rotation speed that is greater than a second predetermined speed, said second predetermined speed being greater than or equal to the first predetermined speed, the rod extends in the second orientation under the effect of the centrifugal force generated by the rotation of the body.

The trimmer head may comprise an even number of rods and of respective rod housings arranged in a regular way along the periphery of the body.

According to an embodiment, the body comprises a base and a cover reversibly joined along a plane perpendicular to the rotation axis of the body.

Preferably, a peripheral portion of the base and the cover comprises a recess, the housing being arranged on either side of said recess such that the retaining portion of the rod extends within said recess.

According to an embodiment, the base and the cover are assembled by at least one screw.

According to an embodiment, the retaining portion comprises two passages extending through the rod for holding a cutting filament in a bent configuration such that each end of said bent filament extends through a respective through-passage.

The diameter of the through-passages may be comprised between 1.6 and 4.5 mm.

Another object of the invention is a trimmer assembly comprising a trimmer head as described above and a cutting filament held by the retaining portion of the rod.

According to an embodiment, the cutting filament has a circular cross-section.

The cutting filament may have a diameter comprised between 1.6 and 4.5 mm, preferably between 3 and 4.5 mm.

The cutting filament may be made of a material comprising at least one of polyamide, polyester, ABS, polypropylene and polyethylene.

BRIEF DESCRIPTION OF THE DRAWINGS

Additional features and advantages of the invention will be apparent from the detailed description that follows, in reference with appended drawings wherein:

FIG. 5A is a side view of a trimmer head according to an embodiment of the invention, in a cleaning configuration, FIG. 5B is a side view of a trimmer head according to an embodiment of the invention, in a cutting configuration.

DETAILED DESCRIPTION OF EMBODIMENTS OF THE INVENTION

Figure 1:
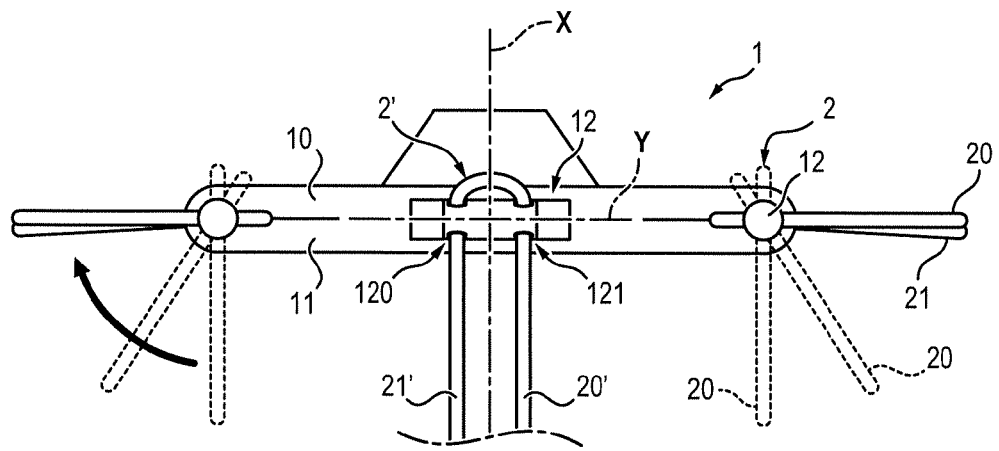
FIG. 1 is a side view of a trimmer head according to an embodiment of the invention, with the cutting filament illustrated in different possible orientations.

FIG. 1 shows a side view of a trimmer head according to an embodiment of the invention, with the cutting filament illustrated in different possible orientations.

The filament may be any filament generally used in trimmer heads.

The filament is typically made of a material comprising at least one of polyamide, polyester, ABS, polypropylene and polyethylene.

The filament may have any cross-sectional shape. When the filament has a circular cross-section, the diameter is generally comprised between 1.6 and 4.5 mm, with a preferred range comprised between 3 and 4.5 mm (providing better work of the trimmer head in both cleaning and cutting configurations).

The trimmer head comprises a body 1 that is intended to be coupled to a driving shaft of a vegetation cutting machine (not shown).

When powered, the driving shaft causes the body 1 to rotate around rotation axis X.

The body 1 generally comprises a base 11 and a cover 10 that are removably joined. For example, the base and the cover are assembled by at least one screw 16 (see FIG. 2). The base and the cover are typically joined along a plane perpendicular to the rotation axis X of the body. The base and the cover may be made of plastic or metal.

The trimmer head comprises at least one rod 12 holding a cutting filament.

The rod is preferably made of metal.

More precisely, the rod comprises a retaining portion that is adapted to receive and firmly hold a cutting filament, even when subjected to the centrifugal force generated by the rotation of the body.

The retaining portion further imparts to the cutting filament a determined direction.

In the embodiment shown in FIG. 1, the retaining portion comprises two passages 120, 121 extending through the rod 12 for holding a cutting filament 2 in a bent configuration such that each end 20, 20' of said bent filament extends through a respective through-passage 120, 121.

The respective diameters of the through-passages 120, 121 and of the cutting filament 2 are advantageously chosen such that a friction force is exerted on the cutting filament when it is inserted in the through-passages. In addition, due to the stiffness of the cutting filament, the bend, which is typically U-shaped, resists the centrifugal force that tends to urge the filament outside of the rod.

This embodiment is however not limitative and any other rod portion fulfilling said retaining function could be implemented without departing from the scope of the present invention. For example, the filament could be retained on the rod such that only one end extends from the rod. In addition, any other ways of firmly retaining the filament on the rod or attaching the filament to the rod may be used.

The rod 12 is arranged with respect to the body 1 so as to have its axis Y that is perpendicular to the rotation axis X of the body and substantially tangent to the rotational path of the body.

In normal use of the trimmer head, if one considers that the rotation axis X of the body 1 is substantially vertical (i.e. perpendicular to the ground), the rod 12 is substantially horizontal and tangent to the rotational path of the body.

The rod 12 is arranged in the peripheral region of the body.

Figure 2:
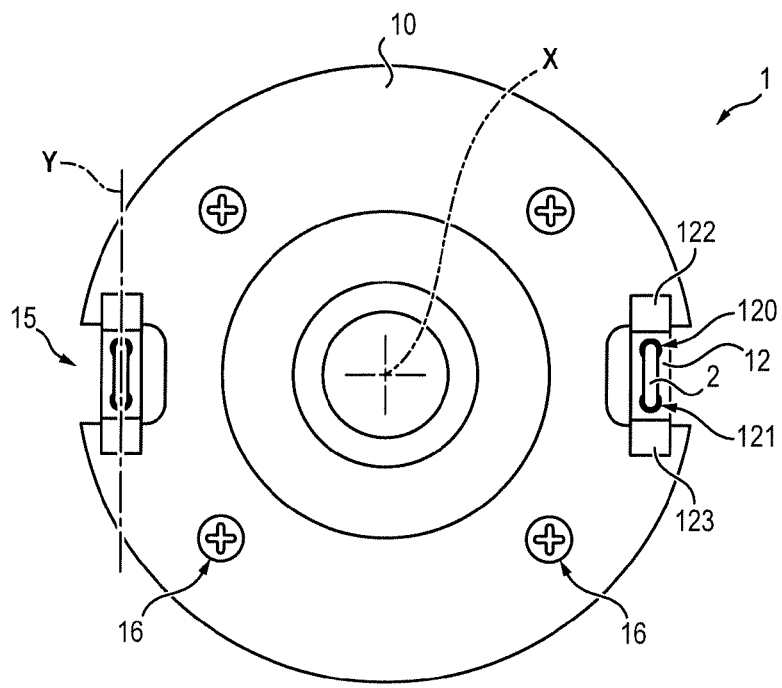
FIG. 2 is a top view of a trimmer head according to an embodiment of the invention, in a cleaning configuration.
Figure 3:
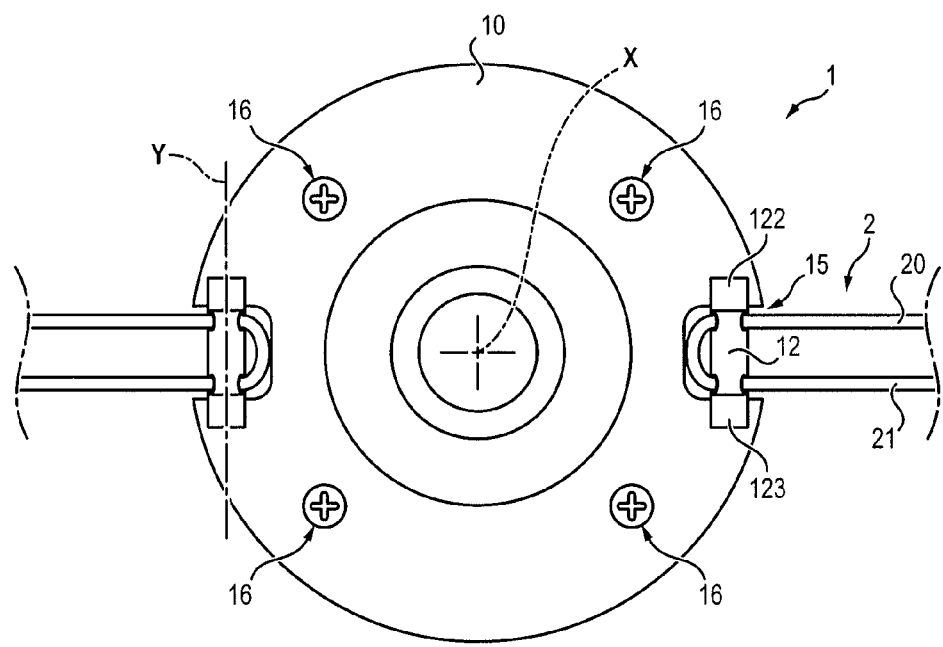
FIG. 3 is a top view of a trimmer head according to an embodiment of the invention, in a cutting configuration.

As shown in FIGS. 2 and 3, the rod 12 is maintained in the body 1 by a housing 13 that receives both ends 122, 123 of the rod.

According to a preferred embodiment, respective peripheral regions of the base 11 and cover 10 of the body are recessed such that retaining portion of the rod 12 (and, if appropriate, the cutting filament) extends within said recess 15. In such case, the housing 13 thus extends on either side of the recess 15.

The trimmer head typically comprises an even number of rods and respective housings arranged in a regular way along the periphery of the body. Advantageously, the rods are arranged by pairs in diametrically opposite positions.

The orientation of the rod with respect to the body can be selectively adjusted between:

(i) a first orientation wherein the determined direction of the filament is substantially parallel to the rotation axis X of the body, thus allowing using the trimmer head to clean the ground (see FIG. 5A), and (ii) a second orientation wherein the determined direction of the filament is substantially radial and substantially perpendicular to the rotation axis X of the body, thus allowing using the trimmer head to cut vegetation (see FIG. 5B).

The adjustment between said two orientations can be made in a continuous manner, e.g. via a rotation of the rod with respect to the housing.

According to an embodiment, the rod 12 is rotatably mounted in the housing 13.

To that end, the rod ends 122, 123 and the housing 13 have respective circular shapes.

Figure 4:
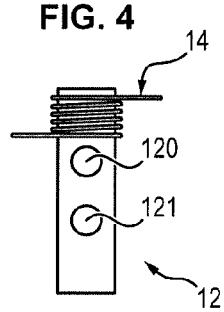
FIG. 4 is a view of the rod for holding the passageway.

As shown in FIG. 4, a torsion spring 14 is arranged at one end of the rod and is received in the housing.

The spring 14 (and in particular its stiffness) is configured such that:

when the body 1 rotates at a rotation speed that is less than a first predetermined speed (e.g. 4 to 5 rpm), the spring urges the rod 12 in the first position against the centrifugal force generated by the rotation of the body;

when the body 1 rotates at a rotation speed that is greater than a second predetermined speed (e.g. 5 to 10 rpm), said second predetermined speed being greater than or equal to the first predetermined speed, the rod 12 extends in the second position under the effect of the centrifugal force generated by the rotation of the body.

When the body rotates at a speed that is between the first and second predetermined speeds, the centrifugal force is not able to completely cancel the spring force and the rod may be in an orientation where the cutting filament extends in an oblique direction.

Hence, the orientation of the filament (and thus the function fulfilled by the trimmer head) can be controlled via the rotation speed of the trimmer head, without requiring any dismantling of the trimmer head.

According to another embodiment, the rod 12 can adopt only a limited number of possible orientations with respect to the body. In such case, the rod 12 is locked in the housing 13 in at least two different orientations without being able to rotate around its axis Y.

To that end, at least one rod end and the housing typically comprise respective polygonal shapes that prevent any rotation of the rod with respect to the housing.

Figure 6:
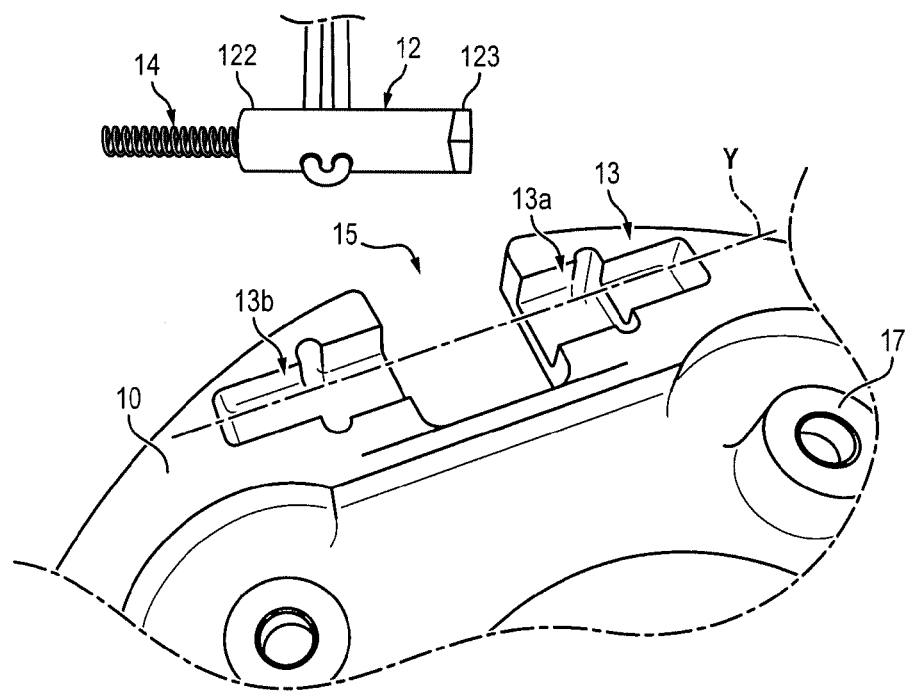
FIG. 6 is an exploded view of a trimmer head according to an embodiment of the invention wherein the rod is locked in the body.
Figure 7:
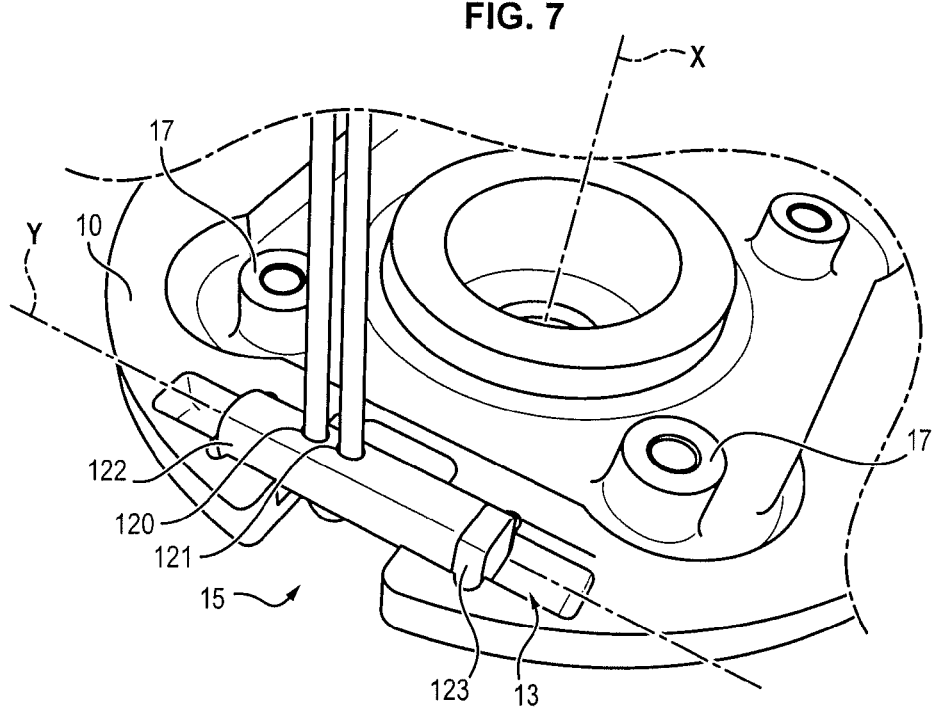
FIG. 7 is an inner view of the trimmer head of the embodiment of FIG. 6.

For example, as shown in FIGS. 6 and 7, rod end 123 may present a square cross-section and the corresponding portion 13*a* of the housing may present a corresponding square cross-section. The other portion 13*b* of the housing 13 can have or not the same cross-section as the portion 13*a*.

Hence, depending on the relative orientations of said square sections, the retaining portion of the rod can be oriented either in the above-mentioned first orientation where the filament extends substantially radially or in the above-mentioned second orientation where the filament extends substantially parallel to the rotation axis of the body.

In such case, the rotational speed of the body does not affect the orientation of the rod.

In this embodiment, dismantling and re-assembling the base and the cover is required in order to change the orientation of the rod with respect to the housing. However, said operation only requires removing the screws that join the base and the cover, placing the rod in the desired orientation and screwing said screws. This change between first and second positions of the rod is thus easy and quick.

REFERENCES

DE 102012016026

The invention claimed is:

1. A trimmer head for a vegetation cutting machine, comprising:
a body adapted to be coupled to a driving shaft of the vegetation cutting machine so as to cause said body to rotate about a rotation axis,
at least one rod provided with an axis and comprising at least one retaining portion intended to hold a cutting filament in a determined direction,
wherein the body comprises a housing for receiving each end of said rod such that the rod axis is perpendicular to the rotation axis of the body and substantially tangential to a rotational path of the body, said housing and said ends of the rod having respective shapes allowing at least two relative orientations of the rod with respect to the body:
a first orientation wherein the determined direction of the filament is substantially parallel to the rotation axis of the body, and
a second orientation wherein the determined direction of the filament is substantially radial and substantially perpendicular to the rotation axis of the body.

2. The trimmer head of claim 1, wherein the rod is locked within the housing in either the first orientation or the second orientation.

3. The trimmer head of claim 2, wherein at least one of the ends of the rod and a portion of the housing have complementary polygonal shapes.

4. The trimmer head of claim 1, wherein the rod ends are rotatably mounted in the housing, the trimmer head further comprising at least one spring urging the rod in the first orientation against the centrifugal force generated by the rotation of the body while the body rotates at a rotation speed that is less than a first predetermined speed.

5. The trimmer head of claim 4, wherein said at least one spring is such that when the body rotates at a rotation speed that is greater than a second predetermined speed, said second predetermined speed being greater than or equal to the first predetermined speed, the rod extends in the second orientation under the effect of the centrifugal force generated by the rotation of the body.

6. The trimmer head of claim 1, comprising an even number of rods and of respective rod housings arranged in a regular way along the periphery of the body.

7. The trimmer head of claim 1, wherein the body comprises a base and a cover reversibly joined along a plane perpendicular to the rotation axis of the body.

8. The trimmer head of claim 7, wherein a peripheral portion of the base and the cover comprise a recess, the housing being arranged on either side of said recess such that the retaining portion of the rod extends within said recess.

9. The trimmer head of claim 7, wherein the base and the cover are assembled by at least one screw.

10. The trimmer head of claim 1, wherein the retaining portion comprises two passages extending through the rod for holding a cutting filament in a bent configuration such that each end of said bent filament extends through a respective through-passage.

11. The trimmer head of claim 10, wherein the diameter of the through-passages is comprised between 1.6 and 4.5 mm.

12. A trimmer assembly comprising:
a trimmer head comprising:
a body adapted to be coupled to a driving shaft of a vegetation cutting machine so as to cause said body to rotate about a rotation axis,
at least one rod provided with an axis and comprising at least one retaining portion intended to hold a cutting filament in a determined direction,
wherein the body comprises a housing for receiving each end of said rod such that the rod axis is perpendicular to the rotation axis of the body and substantially tangential to the rotational path of the body, said housing and said ends of the rod having respective shapes allowing at least two relative orientations of the rod with respect to the body:
a first orientation wherein the determined direction of the filament is substantially parallel to the rotation axis of the body, and
a second orientation wherein the determined direction of the filament is substantially radial and substantially perpendicular to the rotation axis of the body; and
at least one cutting filament held by the retaining portion of a respective rod.

13. The trimmer assembly of claim 12, wherein the cutting filament has a circular cross-section.

14. The trimmer assembly of claim 13, wherein the cutting filament has a diameter comprised between 1.6 and 4.5 mm.

15. The trimmer assembly of claim 12, wherein the cutting filament is made of a material comprising at least one of polyamide, polyester, ABS, polypropylene and polyethylene.

* * * * *